Figure 1:
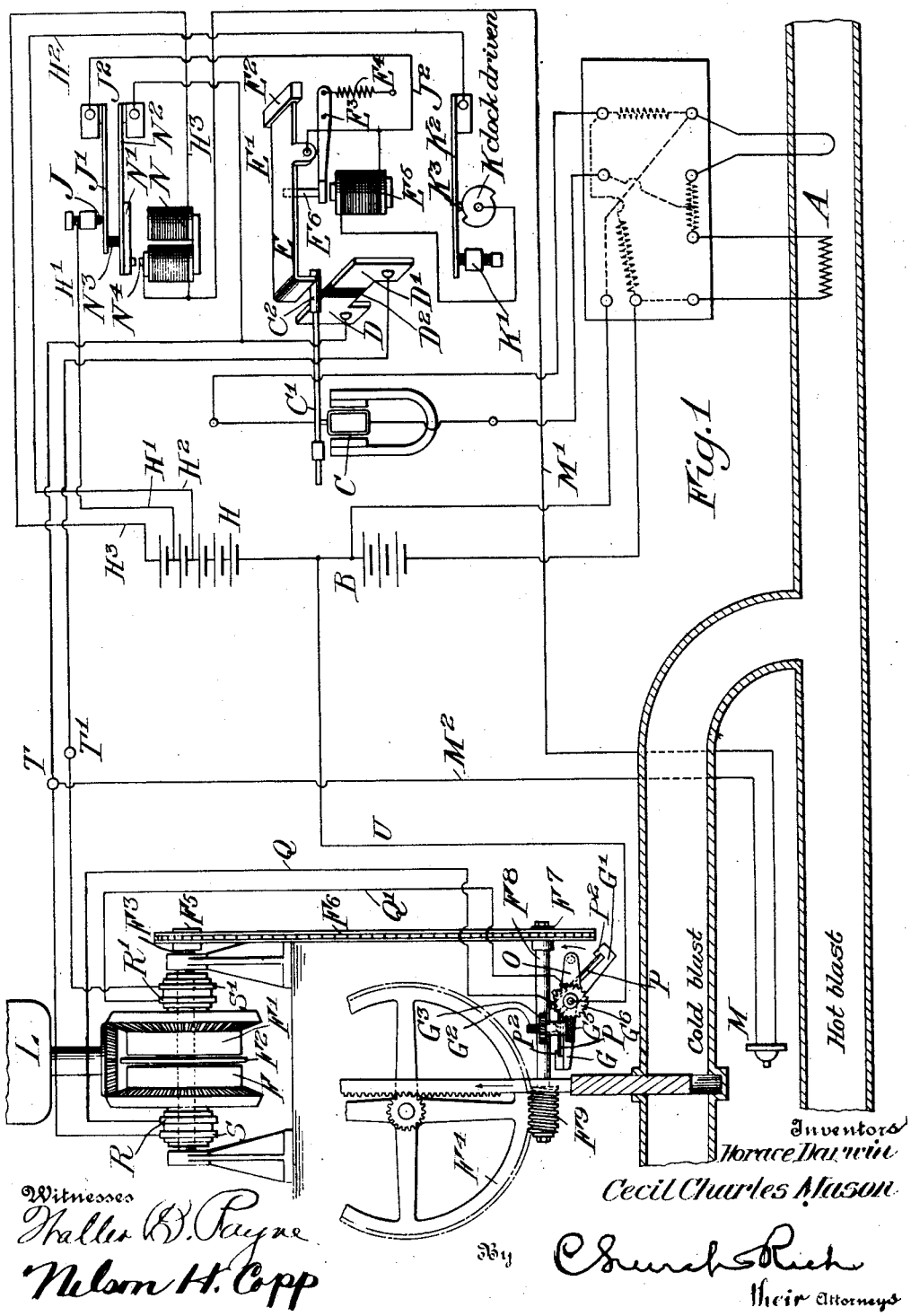

H. DARWIN & C. C. MASON.
APPARATUS FOR REGULATING THE TEMPERATURE OF FLUIDS.
APPLICATION FILED AUG. 14, 1911.

1,170,614.

Patented Feb. 8, 1916.
3 SHEETS—SHEET 2.

Witnesses
Walter B. Payne
Russell [illegible]

Inventors
Horace Darwin
Cecil Charles Mason
by [illegible]
their Attorneys

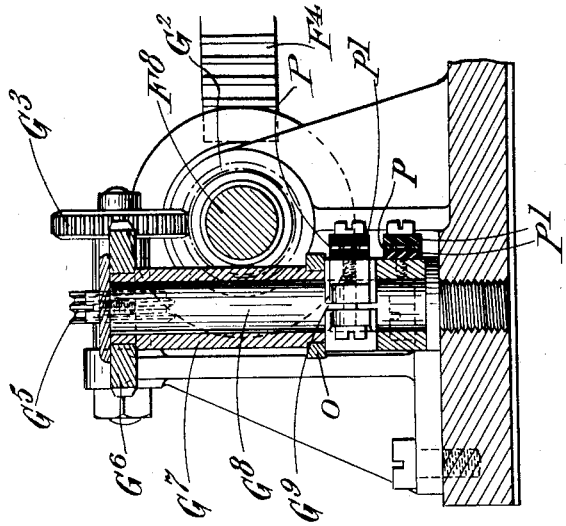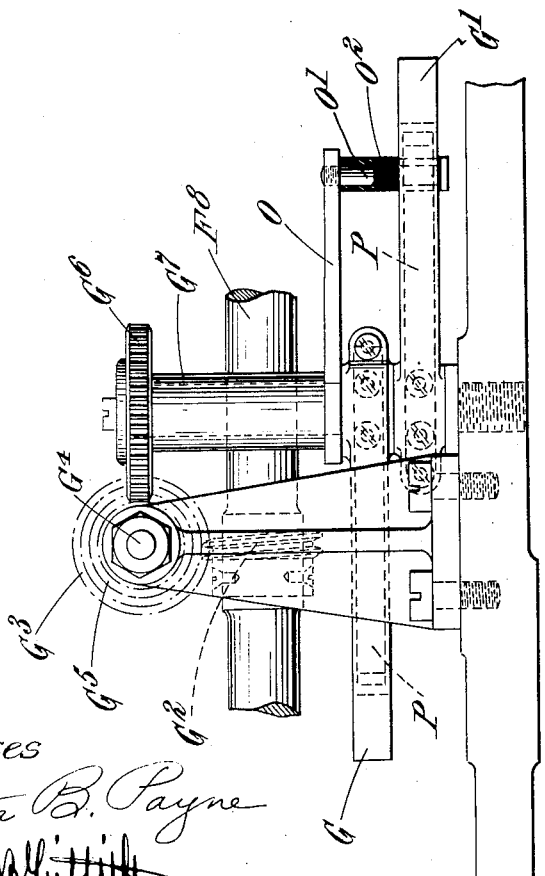

UNITED STATES PATENT OFFICE.

HORACE DARWIN AND CECIL CHARLES MASON, OF CAMBRIDGE, ENGLAND, ASSIGNORS TO TAYLOR INSTRUMENT COMPANIES, OF ROCHESTER, NEW YORK.

APPARATUS FOR REGULATING THE TEMPERATURE OF FLUIDS.

1,170,614.  Specification of Letters Patent.  Patented Feb. 8, 1916.

Application filed August 14, 1911. Serial No. 643,823.

*To all whom it may concern:*

Be it known that we, HORACE DARWIN, F. R. S., and CECIL CHARLES MASON, subjects of the King of England, both residing at Cambridge, England, have invented certain new and useful Improvements in Apparatus for Regulating the Temperature of Fluids, of which the following is a specification.

This invention relates to apparatus for regulating the temperature of fluids and in particular to those cases in which a supply of fluid at an approximately constant temperature is required in spite not only of a tendency to indeterminate changes which are relatively slow and small but also of a tendency to changes of a recurrent nature which are relative rapid and large. These two tendencies are both present in some instances in which a fluid of approximately constant temperature, for example a hot blast, is desired and is produced by mixing currents of two fluids at different temperatures. In such cases it is desirable, in order to meet the tendency to slow indeterminate changes that the main regulating device, such for example as a valve or electric switch, shall be moved comparatively slowly to follow such changes but that at each recurrence of tendency to a large and rapid change it shall be moved with rapidity and through a relatively wide range of movement to meet this change. As a rule the duration of the recurrent tendency to a large change, and its direction, are fairly well known and this tendency can to a large extent therefore be met by giving to the main regulating device movement in the appropriate direction and to the required amount for a predetermined period, that is to say, determined in advance by the change to be anticipated.

According to the present invention where a fluid of approximately constant temperature is to be produced in the manner hereinbefore referred to there is employed with one of the two fluids either to control its rate of supply or to control the heat imparted to it, a power operated device, for example a power operated valve, whose degree of function is automatically regulated by a thermometer in the mixed fluid conduit.

One feature of the present invention, by which the differing tendencies to change may be met, is the provision of a device whereby the power operated device is given more than one speed of operation, whereof one is the normal and is in use during the automatic regulation by the thermometer and the other or others are for use at will.

According to another feature, an automatic temperature regulator for use in the production of a fluid at an approximately constant temperature is associated with a master device for putting the automatic operation of the regulator out of action at will for a predetermined period.

In one construction according to this invention, the tendency to slow indeterminate changes is coped with by employing a device which automatically brings the automatic regulator into intermittent action and the recurrent tendencies are met by employing a master device, either to put the intermittent action device alone or both the intermittent action device and the automatic regulator, out of action for the predetermined period. The operation of the master device may with advantage also impose during the predetermined period regulation in a direction contrary to the recurrent tendency, and this regulation may conveniently be effected through the medium of the otherwise automatic regulator rendered for the time being non-automatic by the controlling effect of the master device.

Other novel features of this invention will be explained with reference to the drawings and will be pointed out in the claims.

A construction according to this invention of electric apparatus adapted to the regulation of hot blast temperature is given by way of example and illustrated in the accompanying drawings in which—

Figure 2:
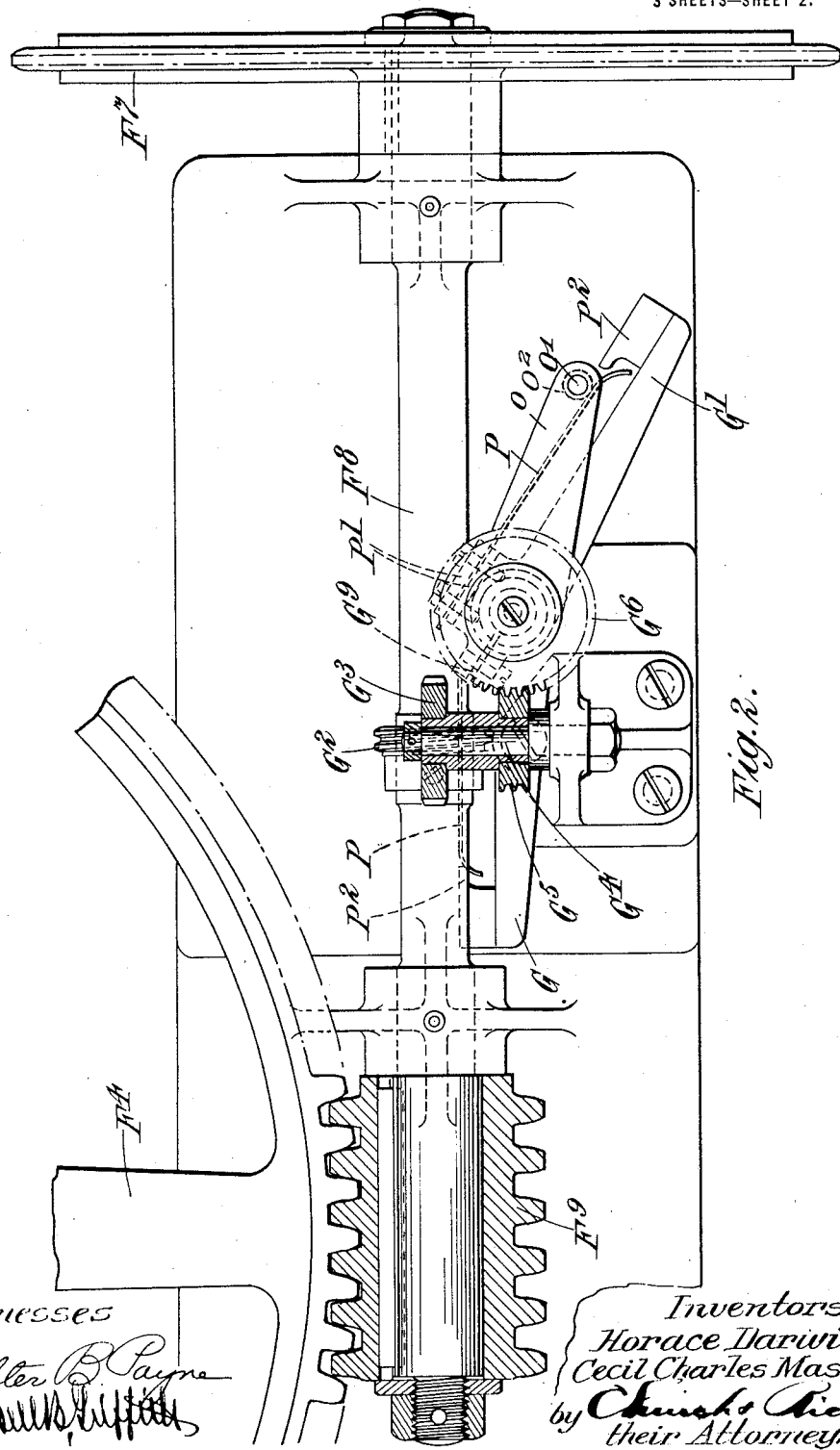

Figure 1 is a diagram representing the general arrangement of electric circuits and controlling gear; Fig. 2 is a plan of part of the valve wheel and of the parts in immediate relation thereto; Fig. 3 is an elevation of a detail; and, Fig. 4 is an elevation of the parts shown in Fig. 3 at right-angles to Fig. 3.

Like reference letters refer to like parts throughout the drawings.

The hot blast is obtained from a mixed supply of cold air and air heated by a stove.

Increased opening of the valve in the cold air supply pipe lowers the temperature of the mixture in the hot blast main, and reduced opening raises the temperature.

A is an electric thermometer placed in the hot blast main to control by aid of the battery B the position of the galvanometer coil C and its boom or pointer C'. The galvanometer boom C' has a metallic end $C^2$ which moves freely over, but not in contact with, two contact pieces D, D' which are separated from one another by an insulating distance piece $D^2$. Above the boom and contacts is a finger E, balanced to fall gently on to the end $C^2$ of the galvanometer boom C' when allowed to do so by the electro-magnet $E^5$, so as to press the end $C^2$ into contact with either D, D' or $D^2$ according to the position in which the boom is at the moment. The finger E is normally lifted away from the contact member $C^2$ by the stud $E^6$ on the pivoted lever $E^3$, one end of which is pulled down by a spring $E^4$, and the other end of which is adapted to be pulled down by the electro-magnet $E^5$. The contact pieces D, D' are connected to the coils F, F' respectively of two electro-magnetic clutches which with their common clutch plate $F^2$ of soft iron constitute a two-way clutch. The clutch plate $F^2$ is free to slide axially along the spindle $F^3$, but drives it rotatably by means of a feather. Rotation of the spindle operates a valve in the cold air main in one direction or the other as required, the power being obtained from a motor L by bevel gear. The circuit from the two clutch coils is completed through contacts G, G' hereinafter more particularly referred to, from a battery H. From the battery H tappings H', $H^2$ and $H^3$ are taken and the path of the current is normally through the wire H' to a contact J and spring tongue J' and thence by wire $J^2$ to the finger E. The electro-magnet $E^5$ is connected between the wire $J^2$ and a special contact device K which is driven by clockwork or other steady speed mechanism and periodically makes and breaks the circuit of the magnet $E^5$ by means of cam projections upon it, through the contact $K^3$ on the spring tongue $K^2$, wire $H^2$, contact J and wire $J^2$ as will be readily understood. The screw K' adjusts the position of the spring tongue $K^2$ and so controls the length of the contact at $K^3$.

L is a motor which is constantly running and which is thrown by means of the clutches F, F' into engagement with the clutch plate $F^2$ to give it rotation in one direction or the other according as the clutch F or the clutch F' is in operation.

Normally, when it is left to cope with the slow indeterminate changes under action of the thermometer A, the action of the apparatus is as follows:—When owing to the rotation of the contact device K the circuit is completed through the tongue $K^2$ and the electro-magnet $E^5$, the stud $E^6$ is pulled down, and the finger E is free to fall on to the end $C^2$ of the boom C' and through it into contact either with the piece D, the piece D' or the distance piece $D^2$. The position of the galvanometer boom is determined in a well-known manner by the thermometer A so that if the temperature to which the thermometer is at this moment exposed is too high, the boom will move over the contact D and circuit is thus made by the finger E through the end $C^2$ of the galvanometer boom, contact piece D, clutch magnet F, contact G, battery H and contact J. Under the action of the clutch F and clutch plate $F^2$ the latter opens the cold air valve by the valve wheel $F^4$ through the sprocket $F^5$, chain $F^6$, sprocket wheel $F^7$ and worm shaft and worm $F^8$ and $F^9$ so cooling the blast in which the thermometer is placed; but the opening action of the motor is of short duration owing to the continued movement of the device K which presently breaks the circuit of the electro-magnet $E^5$. This allows the lever $E^3$ to rise under the action of the spring $E^4$ so breaking the circuit of the clutch F at the contact D. Should the opening of the valve thus effected not be sufficient to reduce the temperature to the required point the next occurrence of a contact caused by the device K will cause a further opening in the same manner as that just described. Should, however, the amount of opening have been too large or should the temperature have fallen through any other cause the next occurrence of contact at the device K will find the galvanometer boom over the contact D' in which case the clutch F' will be operated and the cold air valve will be moved in a direction to close it. Should, however, the temperature be between the desired limits the finger E when depressed will merely press the boom on to the insulating distance piece $D^2$ and no action will occur at the clutch. By adjusting the screw K' the duration of each recurring contact may be readily adjusted to such a value as will on the one hand practically eliminate hunting of the regulating device, and on the other hand will enable the regulating device to operate with sufficient speed to compensate all normal variations in the temperature of the two currents of fluid.

The above described portion of the apparatus suffices to deal with the slow and relatively small temperature changes while the hot blast is being derived from one stove but as this becomes cool a supply from a freshly heated stove becomes necessary and there is tendency on changing stoves, to a large and rapid rise in the temperature of the blast. If the hitherto described portion of the apparatus were sufficiently quick-acting to deal with this large and rapid rise, there would be great practical difficulty in preventing it from hunting under the smaller changes. The device K, however, by giving only intermittent action to the clutch enables an arrangement to be used which would be too quick acting if in continuous action. The recurring tendency to a large and rapid rise of temperature is therefore met by the operation of the remaining portion of the apparatus illustrated diagrammatically in Fig. 1.

A push button M is provided, which when pressed completes circuit through the wire M', electro-magnet N, wire $H^3$, battery H, contact G, clutch magnet F and wires T and $M^2$. The electro-magnet N pulls down its armature N' which is carried by the spring tongue $N^2$. This tongue is attached by an insulating link $N^3$ to the tongue J' and downward movement of the armature N' thus breaks circuit at the contact J and establishes a fresh circuit at the contact $N^4$. The interruption of the circuit at the contact J renders the action of the device K and contact K' inoperative. The contact $N^4$ is connected with that end of the winding of the magnet N which is also connected directly to the push button M so that if the push button M be now released the magnet N will still be energized through the contact $N^4$. The magnet N is thus a self-maintaining electro-magnet, that is to say, one which having been initially energized by the push button M remains energized owing to the contact made by its own attraction for its own armature and will remain energized until the circuit is broken by some other means. The action of this portion of the apparatus is as follows:— The push button is placed in convenient proximity to the stoves from which the hot air is derived and when the man in charge of the stoves has to change from a cool to a freshly heated stove he presses the button M for a moment and then releases it. This energizes the magnet N, which owing to its self-maintaining property holds the contact at $N^4$ closed and the contact at J broken and so completes and maintains circuit through the clutch magnet F. The motor L, therefore, gives to the cold air valve continuous movement in a direction to open it and this operation proceeds until a mechanical limiting device opens the circuit at the contact G so deënergizing the magnet N, releasing its armature, reëstablishing the contact J and permitting the apparatus to return to its normal working through the contact device K and contact K'.

The mechanical limiting device just referred to is illustrated in detail in Figs. 2, 3 and 4. The worm shaft $F^8$ carries in addition to the worm $F^9$ by which the valve wheel $F^4$ is operated, a second and smaller worm $G^2$. The worm $G^2$ gears with a worm wheel $G^3$ mounted upon a sleeve free to revolve on a fixed spindle $G^4$. Upon the same sleeve is fixed yet another worm $G^5$ engaging with a third worm wheel $G^6$. The wheel $G^6$ is mounted upon a sleeve $G^7$ free to rotate upon a fixed pin $G^8$ and the sleeve $G^7$ has secured to its other end an arm O having at its free end a downwardly projecting pin O' incased in an insulating sleeve $O^2$. Mounted upon the pin $G^8$ are the contact devices G, G', each of which comprises an arm, one end of which is bored to fit the pin and split as at $G^9$ so as to be capable of being clamped by a screw firmly in an adjusted position upon the pin $G^8$. The arms G, G' carry flexible spring tongues P clamped between insulating strips P' to their respective arms. The outer ends of these tongues normally make contact with projections $P^2$ at the free ends of the arms G, G'. One of the tongues is in circuit with the coil of the magnetic clutch F through the wire Q (Fig. 1) and slip ring R and the other with the coil of the magnetic clutch F' through wire Q' and slip ring R', from whence the circuit is completed through slip rings S, S' and the wires T, T' to the contact devices D, D' respectively. The wire U, (Fig. 1) is connected to a metallic framework supporting the pin $G^8$ and is thus in connection with both the arms G, G'.

The action of the device is as follows:— When from the use of the push button M or from any other cause the sprocket wheel $F^7$ (Fig. 2) is continuously revolved in either direction until a point is reached at which it is desired to limit the movement of the valve, the arm O being carried around by the worm gears interposed between it and the worm shaft $F^8$ strikes against one of the two tongues $P^3$ by means of its pin O' which being insulated therefrom by the sleeve $O^2$ causes the tongue to be moved away from the corresponding projection $P^2$ so breaking the circuit at that contact as is shown at G' in Fig. 2. Interruption of the circuit at this point breaks the circuit through the corresponding coil of the magnetic clutch and stops the movement.

It will be seen that by slackening the screws at the split portion $G^9$ of the arms G, G', the latter may be adjusted rotatably about the pin $G^8$ so as to cause the above described limiting action device to come into operation at any desired position of the valve.

The above described method of applying this invention and its application to the control of a hot blast are by way of illustration only and there are many modifications that can be made in it without departing frome the scope of the invention. Further, whereas the control has been described as effected through varying the amount of cold air supplied to the mixture the cold air being presumed to be at an approximately uniform temperature, the ultimate temperature of the mixture may be maintained constant in some cases by varying the heat supplied to it, or to one of the elements of the mixture where fluids other than air are used. Further, also, in place of the intermittent action which is replaced by continuous action in the above described apparatus to obtain two speeds of operation of the valve wheel $F^4$, any known change speed gear may be employed by which under the control of the man at the stoves the wheel may be operated at a greater rate when the change is just freshly made than when in normal automatic working.

The apparatus has been described as applied to the control of hot blast temperature and for such purposes it is peculiarly well adapted but it or any of its parts or modifications may be applied to the control of the temperature of any fluid.

What we claim as our invention and desire to secure by Letters Patent is:—

1. In apparatus for producing a fluid of approximately constant temperature by the admixture of a plurality of fluids of different temperatures, the combination of, a source of supply of each of the fluids of different temperatures, a valve controlling one source of supply, a heat-sensitive device A, a moving contact $C_2$ controlled by the heat-sensitive device, contacts D D′, an electromagnetic relay E $E^5$, an intermittently operating contact K $K^2$ $K^3$ in electrical connection with the relay, an electric circuit including contacts D $C^2$ J′ J and clutch F, an electric circuit including contacts D′ $C^2$ J′ J and clutch F′ an electromagnet N, a main controlling circuit M M′ $M^2$ including the electromagnet N, another circuit including the electromagnet N, and its armature N′ and spring $N^2$ a source of electric energy and connections between it and the several electric circuits a motor L operating through clutches F F′ and connections $F^5$ $F^6$ $F^7$ $F^8$ $F^9$ $F^4$ to operate the valve.

2. In apparatus for producing a fluid of approximately constant temperature by the admixture of a plurality of fluids of different temperatures, the combination of, a source of supply of each of the fluids of different temperatures, a valve controlling one source of supply, a heat-sensitive device A, a moving contact $C_2$ controlled by the heat-sensitive device, contacts D D′, an electromagnetic relay E $E^5$, an intermittently operating contact K $K^2$ $K^3$ in electrical connection with the relay, an electric circuit including contacts D $C^2$ J′ J and clutch F, an electric circuit including contacts D′ $C^2$ J′ J and clutch F′ an electromagnet N, a main controlling circuit M M′ $M^2$ including the electromagnet N, another circuit including the electromagnet N and its armature N′ and spring $N^2$ a source of electric energy and connections between it and the several electric circuits a motor L operating through clutches F F′, connections $F^5$ $F^6$ $F^7$ $F^8$ $F^9$ $F^4$ to operate the valve, and a limiting device O O′ P $P^2$ to terminate the duration of the main control.

3. In a fluid governing apparatus, the combination with a fluid supply, of a controlling means coöperating with the fluid supply, a movable contact subjected to the fluid supply and controlled thereby, a plurality of circuits with which said movable contact may coöperate, said controlling means being actuated by the last mentioned circuits, an actuator coöperating with the contact to move it into engagement with said circuits, a relay controlling the actuator, means for energizing and deënergizing the relay and a source of electric energy for the circuits.

4. In a fluid governing apparatus, the combination with a fluid supply, of a controlling means coöperating with the fluid supply, a movable contact subjected to the fluid supply and controlled thereby, a plurality of circuits with which said movable contact may coöperate, said controlling means being actuated by the last mentioned circuits, an actuator coöperating with said contact to move it into engagement with the circuits, a relay controlling the actuator, means acting intermittently to energize and deënergize said relay, and a source of electric energy for the circuits.

5. In a fluid governing apparatus, the combination with a fluid supply, of a controlling means coöperating with the fluid supply, a movable contact controlled by the fluid, a plurality of circuits with which said movable contact may coöperate, said controlling means being actuated by the last mentioned circuits, an actuator coöperating with the contact to move it into engagement with said circuits, a relay controlling the actuator, means for energizing and deënergizing the relay, a main control for operating the controlling means independently of the movable contact, and a source of electric energy for the circuits.

6. In a fluid governing apparatus, the combination with a fluid supply, of a controlling means coöperating with the fluid supply, a movable contact controlled by the fluid, a plurality of circuits with which the movable contact may coöperate, said controlling means being actuated by the last mentioned circuits, an actuator coöperating with the contact to move it into engagement with said circuits, a relay controlling the actuator, means acting intermittently to energize and deënergize the relay, a main control for operating the controlling means independently of said movable contact, and a source of electric energy for the circuits.

7. In a fluid governing apparatus, the combination with a fluid supply, of a controlling means coöperating with the fluid supply, a movable contact controlled by the fluid, a plurality of circuits with which said movable contact may coöperate, an actuator coöperating with the contact to move it into engagement with said circuits, a relay controlling the actuator, a clutch member operated by the last mentioned circuits, an electric motor, connections between the clutch member and motor whereby the clutch member is caused to operate said controlling means, and a source of electric energy for the circuits.

In testimony whereof we have signed our names to this specification in the presence of two subscribing witnesses.

HORACE DARWIN.
CECIL CHARLES MASON.

Witnesses:
BERNARD E. KING,
A. G. COCKERTON.